O. D. WIGGINS.
SPRAY PUMP.
APPLICATION FILED AUG. 5, 1920.
1,403,140.
Patented Jan. 10, 1922.
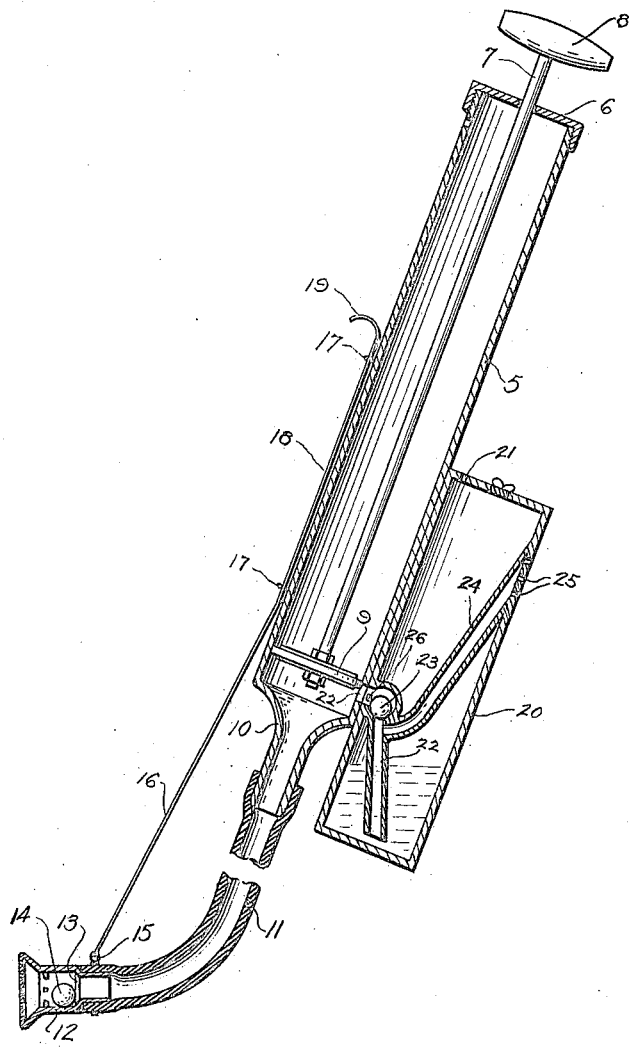
WITNESSES.
Owen D. Wiggins. INVENTOR.
BY
ATTORNEY.

UNITED STATES PATENT OFFICE.

OWEN D. WIGGINS, OF LAUREL, INDIANA.

SPRAY PUMP.

1,403,140.　　　　Specification of Letters Patent.　　Patented Jan. 10, 1922.

Application filed August 5, 1920. Serial No. 401,507.

*To all whom it may concern:*

Be it known that I, OWEN D. WIGGINS, a citizen of the United States, residing at Laurel, in the county of Franklin and State of Indiana, have invented certain new and useful Improvements in a Spray Pump, of which the following is a specification.

This invention relates to a spray pump and has for its principal object to provide a device of this character which may be conveniently carried about by the operator, said device including means whereby an insecticide may be sprayed or otherwise distributed under pressure upon the foliage.

Another object of the invention is to provide a distributing hose in conjunction with a device of this nature, said distributing hose provided with means so that the insecticide may be applied to the plant from different points of vantage.

A still further object of the invention is to generally improve upon spray pumps of this character by providing a device which will be of extremely simple, durable and inexpensive of construction, one which is efficient and reliable in operation, and well adapted to the purpose for which it is designed.

With these and numerous other objects in view the invention resides in certain novel features of construction, combination and arrangement of parts as will be hereinafter fully described and claimed.

In the accompanying drawing:—

The figure is a vertical section taken through the invention.

Referring in detail to the drawing, 5 designates a cylinder having its upper end open and provided with exterior threads for receiving the closure head 6 which is centrally apertured for receiving the pump rod 7 having the handle 8 upon its outer terminal. The usual plunger 9 is situated upon its inner end so as to reciprocate within the cylinder 5 in a well known manner. The lower end of the cylinder 5 is tapered so as to form the spout 10 to which the hose 11 is attached in any suitable manner. At the end of this hose 11 there is provided a spray 12 which has the valve seat 13 actuated therein for receiving the spherical valve 14 for a purpose to be hereinafter set forth. An eye bolt 15 is situated upon the free end of the hose 11 and a cable 16 is attached thereto. A pair of eye bolts 17 for receiving the rod 18 are situated upon the outer side of the cylinder 5. The cable 16 is attached to this rod 18 in any suitable manner and it will be noted that the upper end of the rod 18 is bent to form a hook handle 19. Thus by pulling upwardly upon the rod 18 the spout may be placed in such a position that it may be utilized under a small plant so as to throw the insecticide upwardly and by similar adjustments of this rod 18 the insecticide may be thrown upon the plant at whatever angle may be desirable.

A tank 20 of any suitable shape is attached to the cylinder 5 in any suitable manner and preferably so that a portion thereof extends below the body portion of the cylinder 5 as is clearly shown in the drawing. At the top of the tank 20 an air hole 21 is provided and this tank is normally filled about two thirds full of the desired liquid. A pipe 22 extends downwardly into this liquid and terminates a relatively short distance from the bottom of the tank 20. This pipe communicates with the opening 22 provided in the cylinder wall of the cylinder 5 and it will also be noted that a spherical valve 23 is seated upon a valve seat provided in the pipe 22 so that the liquid which will be forced into the cylinder 5 by the upward movement of the plunger 9 will not again flow into the tank 20 when this plunger is pulled downwardly. An air pipe 24 is connected with the upper portions of the liquid pipe 22 and extends upwardly so as to terminate adjacent the upper portion of the side walls of the tank 20 and is in communication with the outer atmosphere by means of a plurality of openings 25 provided in the side wall of the tank 20 adjacent the terminal of the air pipe 24. Thus it will be seen that upon the upward movement of the plunger 9 not only the liquid will be drawn through the pipe 22 but a certain amount of air will be mixed therewith through the air pipe 24 and of course when the plunger 9 is forced downwardly this air and liquid will be compressed and forced out of the spray 12. The valve 14 will prevent any air from coming into the cylinder 5 upon the upward movement of the plunger 9. It will also be noted that a pin 26 is provided within the terminal of the pipe 22 so as to prevent the spherical valve 23 from closing the opening leading into the cylinder 5. This spherical valve 23, therefore, will only prevent the movement of the liquid and air mixture from passing from the cylinder 5 into the tank 20 but will in no way interfere with the passage of the liquid in the opposite direction that is from the tank 20 to the cylinder 5.

While I have shown and described the particular form and construction of the several elements employed, it will be understood that the invention is susceptible of considerable modification therein, and I therefore reserve the privilege of resorting to all such legitimate changes as may be thoroughly embodied within the spirit and scope of the invention as claimed.

Having thus described my invention, what I claim as new is:—

1. A supply tank to be used for the purpose specified comprising a body portion, an outlet situated in the side of said tank intermediate its ends, a liquid pipe depending from said outlet and having a valve at its inner end, an air pipe communicating with said liquid pipe and extending upwardly in said tank and terminating at the side wall thereof, said side wall having a plurality of apertures forming the inlet to said air pipe.

2. A device of the class described comprising a pump, a supply tank mounted on said pump, and provided with an opening for registering with an opening situated adjacent the end of said pump, a liquid pipe depending from the opening in said tank, an air pipe in communication with said liquid pipe and extending upwardly in said tank, and terminating so as to register with the openings provided in the side walls of the tank, and a valve situated at the top of said liquid pipe so as to allow the liquid to pass into said pump and prevent the same from passing back into said tank, a hose communicating with the outlet of said pump and means attached to said hose for regulating the direction of the flow of liquid therefrom.

In testimony whereof I affix my signature in presence of two witnesses.

OWEN D. WIGGINS

Witnesses:
   JOHN P. SEERST,
   GEORGE W. HUNSINGER.